United States Patent [19]

Iwamoto et al.

[11] Patent Number: 5,187,538
[45] Date of Patent: Feb. 16, 1993

[54] LASER DOPPLER VELOCIMETER

[75] Inventors: Katsuharu Iwamoto, Yokohama; Osamu Kawakami, Yokosuka, both of Japan

[73] Assignee: Kabushiki Kaisha Toshiba, Kawasaki, Japan

[21] Appl. No.: 785,077

[22] Filed: Oct. 30, 1991

[30] Foreign Application Priority Data

Oct. 30, 1990 [JP] Japan ............................. 2-292692
Apr. 23, 1991 [JP] Japan ............................. 3-091861

[51] Int. Cl.⁵ ........................... G01P 3/36; G01B 9/02
[52] U.S. Cl. ............................. 356/28.5; 356/345
[58] Field of Search ............... 356/28.5, 345, 5, 28

[56] References Cited

U.S. PATENT DOCUMENTS

| | | | |
|---|---|---|---|
| 4,311,383 | 1/1982 | Ohtsubo | 356/28.5 |
| 4,974,960 | 12/1990 | Dopheide et al. | 356/28.5 |
| 4,997,272 | 3/1991 | Dopheide et al. | 356/28.5 |
| 5,054,913 | 10/1991 | Ishikawa et al. | 356/28.5 |

FOREIGN PATENT DOCUMENTS 61-281971 12/1986 Japan.
63-191988 8/1988 Japan.

Primary Examiner—Mark Hellner
Attorney, Agent, or Firm—Oblon, Spivak, McClelland, Maier & Neustadt

[57] ABSTRACT

A laser Doppler velocimeter which has an optical system using a semiconductor laser as a light source for receiving a scattered light by reflection from natural particulate in fluid to be measured passing interference fringes formed in a region to be measured by a semiconductor optical detector, and a signal processor having a converter for converting a Doppler signal from the semiconductor optical detector to a predetermined waveform (e.g., a square wave) according to at least two different threshold values, and an arithmetic unit for comparing the processed signals from each other to judge that the scattered signal is from one natural particulate or not (i.e., the propriety of its measuring accuracy) and to calculate the velocity of the fluid to be measured according to the judged result and the process result of the converter from the period of the square wave when judging "a normal measurement".

9 Claims, 13 Drawing Sheets

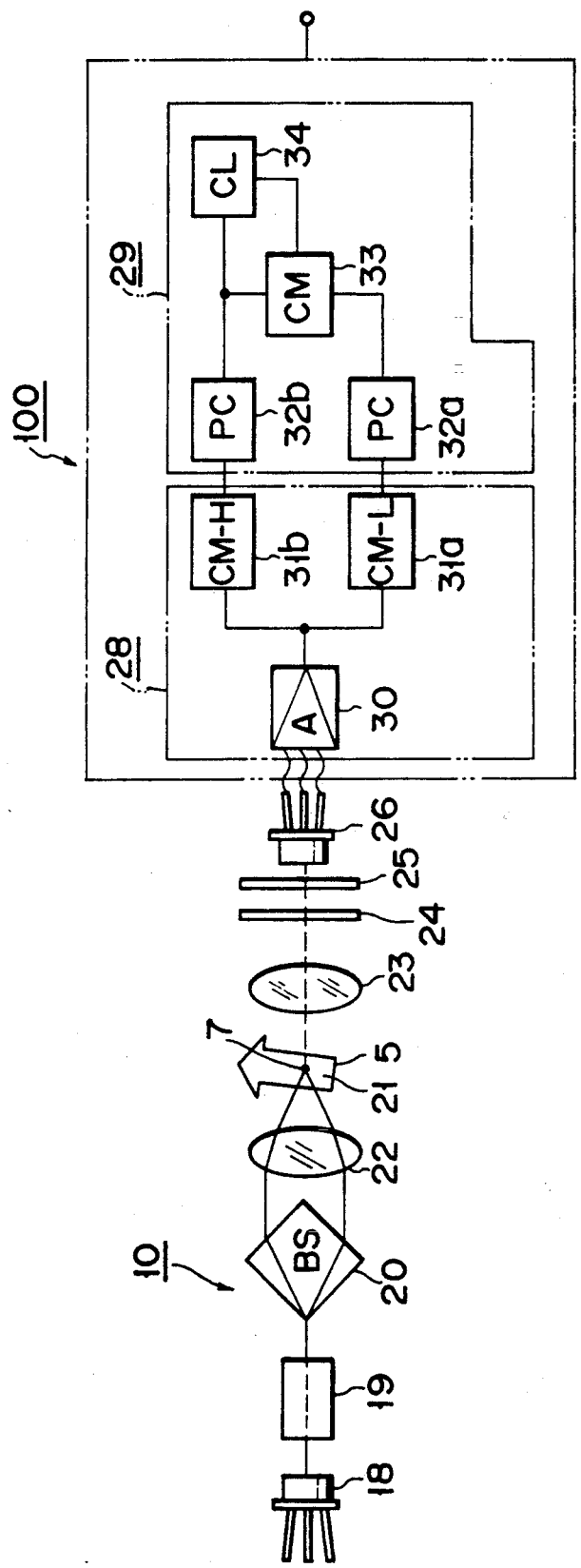
F I G. 1A

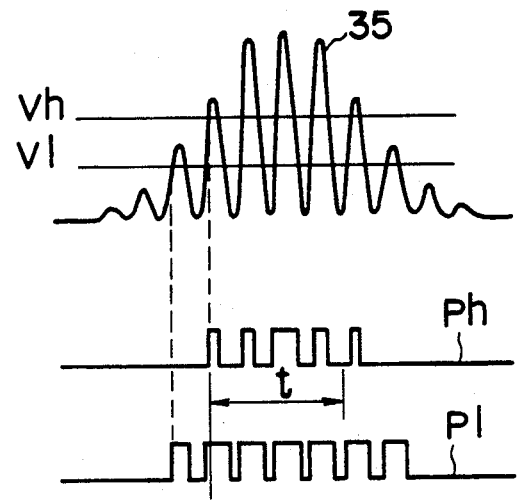
FIG. 2A
FIG. 2B
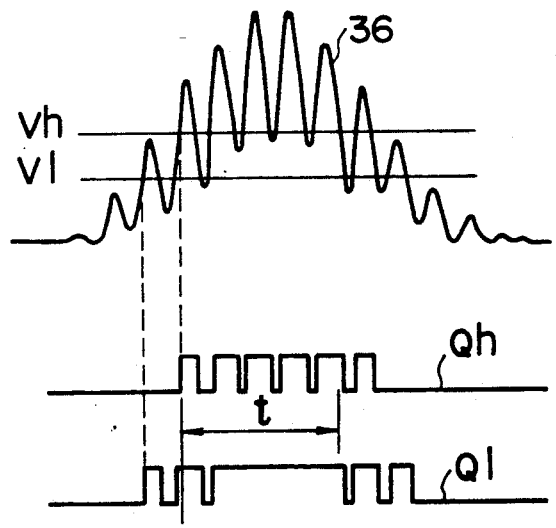
FIG. 3A
FIG. 3B

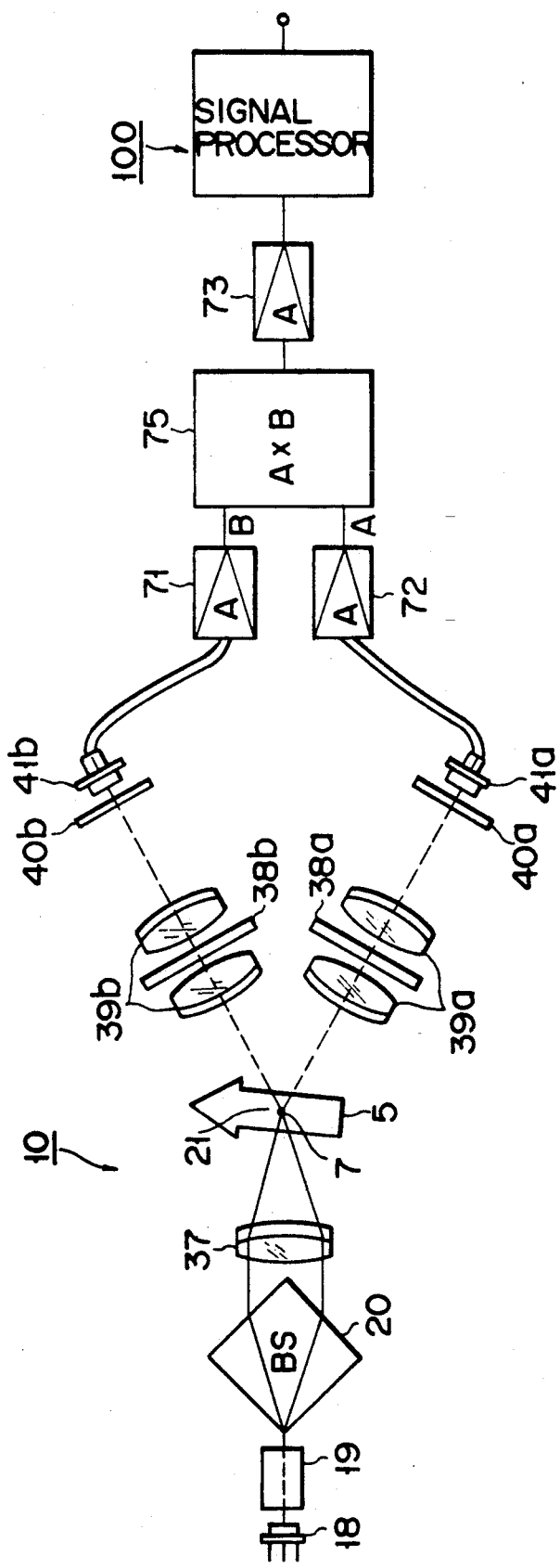
F I G. 4B

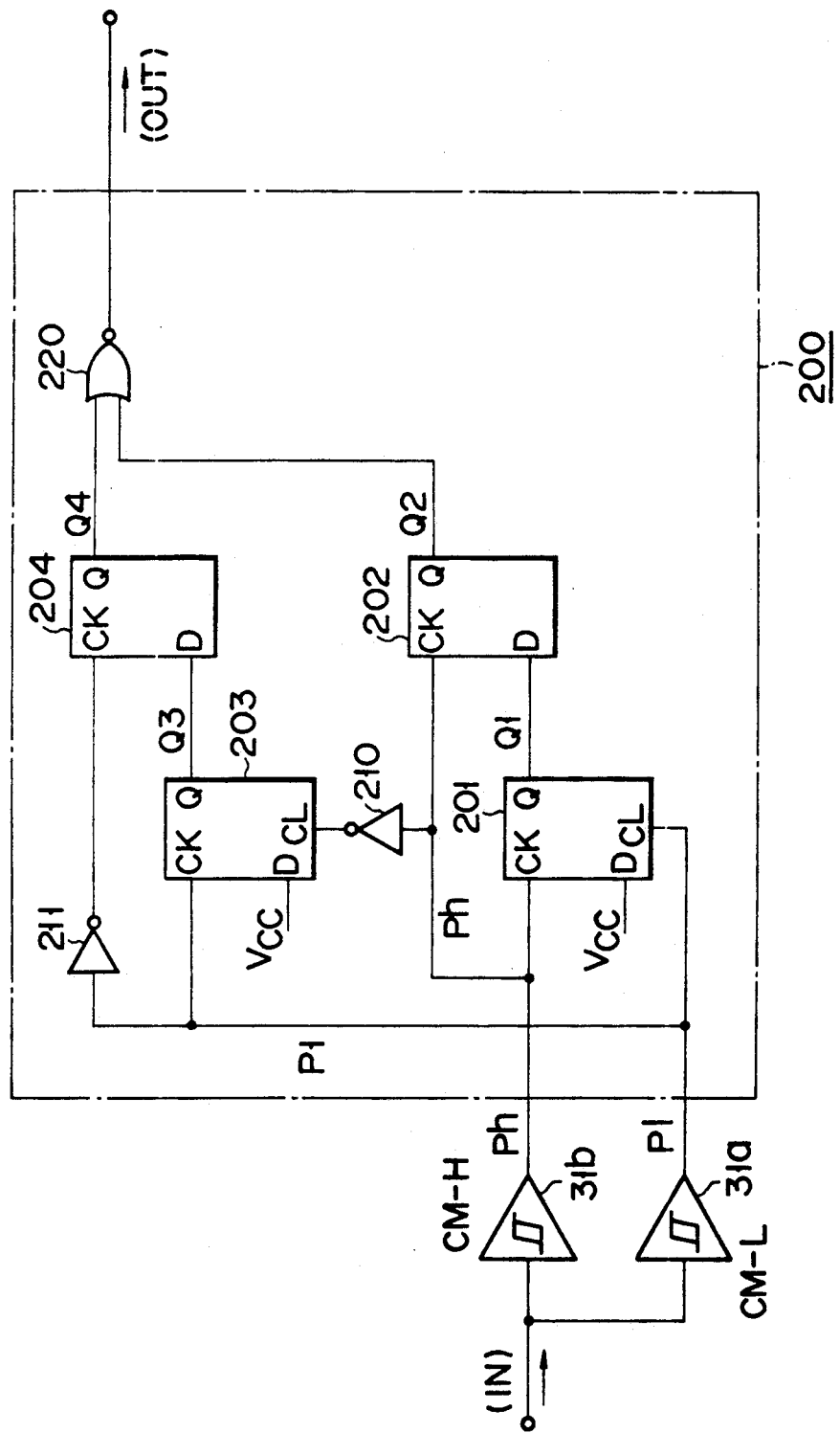
F I G. 9

LASER DOPPLER VELOCIMETER

BACKGROUND OF THE INVENTION

1. Field of the Invention

The present invention relates to a laser Doppler velocimeter for measuring, for example, the velocity of natural particulate in fluid by using a laser, thereby measuring the velocity of the fluid to be measured.

2. Description of the Related Art

As prior art, "a hot wire velocimeter", "a Pitot tube", etc., have been used as an apparatus for measuring an air velocity in a clean room, or measuring the velocity of cold air or hot air to be fed from an air conditioner, etc. Recently, a laser Doppler velocimeter having an He-Ne gas laser, a semiconductor laser, etc., as a light source is employed.

Schematic configuration of one example of conventional laser Doppler velocimeter using the above-described laser light will be shown in FIGS. 12 to 14. In FIG. 12 showing a conventional laser Doppler velocimeter, an He-Ne gas laser 1 of a light source emits a laser light for example, having a wavelength of 632.8 nm. Optical systems are disposed on the optical axis of the gas laser (GL) 1. More specifically, a beam splitter (BS) 2 splits the laser light of the gas laser 1 into two parallel laser lights. A convex lens 3 focuses the two laser lights from the beam splitter 2 to form the interference fringes of the laser lights on a region 4 to be measured. Fluid 5 to be measured is, for example, the air fed from an air conditioner, flowing to the region 4 to be measured. A convex lens 6 is opposed to a convex lens 3 to be measured to focus scattered lights reflected from the natural particulate 7 passing the region 4 to be measured at the same velocity as the air jet. A photomultiplier tube 8 used as the signal detector, receives the light collected by the convex lens 6, and outputs a signal in relation to the light into a signal processor 9. The signal processor 9 calculates on the basis of the output signal from the photomultiplier tube (PH) 8.

The signal processor 9 is an apparatus for calculating the velocity of the fluid 5 to be measured, and constituted as below. The signal processor 9 has a high pass filter (HP) 10 for removing the dc component of the output of the photomultiplier tube 8, a comparator (CM) 11 for converting the output of the high pass filter 10 into a square wave according to the threshold value of a predetermined level, a pulse counter (PC) 12 for counting the number of pulses of the wave of the output of the comparator 11, and a computing circuit (CL) 13 for calculating the velocity of the fluid 5 to be measured from the counted value of the pulse counter 12.

In the conventional laser Doppler velocimeter arranged as described above, "interference fringes" are formed on the region 4 measuring of the two laser lights of the same phase in equal intensity of the gas laser 1, split and refracted by the beam splitter 2. The natural particulate 7 existing in the fluid 5 to be measured pass the region 4 to be measured, i.e., the interference fringes at the same velocity by feeding the fluid 5 to be measured to the region 4 to be measured. When passing the interference fringes, the natural particulate 7 emits scattered light varying strongly and weakly in response to the interference fringes. A portion of the scattered lights is condensed by the convex lens 6, and the condensed light is converged and amplified to a signal responsive to the scattered lights varying strongly and weakly by the photomultiplier tube 8, i.e., a Doppler signal, and the signal is output to the signal processor 9.

In the signal processor 9, the Doppler signal is converted to an ac voltage signal having an amplitude at 0V as a center by removing the dc component from the component of the signal input to the high pass filter 10, and the variation of the reflected light generated when the natural particulate 7 passes the interference fringes is output. The output of the high pass filter 10 is compared with the threshold value of the predetermined value by the comparator 11, converted to a rectangular wave, and the number n of the rectangular waves per unit time is obtained by the pulse counter 12. The velocity v in a direction perpendicular to the interference fringes of the natural particulate 7 is calculated by the following equation from the spacing d of the known interference fringes, the counting time t of the pulse counter 12 and the counted value N (the number of the square waves) by the computing circuit 13.

$$v = n \times d / t$$

Since the velocity v calculated by the above equation is also that of the fluid 5 to be measured which is at the same velocity as the natural particulate 7, the velocity of the fluid 5 to be measured can be measured by previously disposing the region 4 to be measured so that the interference fringes become perpendicular to the flowing direction of the fluid 5 to be measured.

However, in the above-described prior art, if particles which are larger than the interval of the interference fringes constructed in the fluid 5 to be measured pass the interference fringes, or if a natural particulate 7 having larger size than the fringe show passes the interference fringes, the Doppler signal output from the photomultiplier tube 8 becomes a waveform 14 containing a dc component as shown in FIG. 13A. However, when the Doppler signal passes the high pass filter 10, it is converted to the waveform 15 of the ac voltage signal at 0V as a center as shown in FIG. 13B, and fed to the comparator 11. Thus, if the particulate 7 to be measured, having smaller size than the shoring of the interference fringes pass the interference fringes, the Doppler signal of the waveform 16 in FIG. 14A to be output from the photomultiplier tube 8 cannot be distinguished from the AC signal of the waveform 17 shown in FIG. 14B showing the state after passing the high pass filter 10. Therefore, since it measures including inaccurate data when large particles of low velocity or a plurality of natural particulate 7 pas the interference fringes, there arises a problem that the error of the measured results is increased.

Since the entire apparatus is increased in size by disposing the region 4 to be measured so that the flowing direction of the fluid 5 to be measured becomes perpendicular to the interference fringes or by regulating the optical axis of the optical system by using the photomultiplier tube 8 for photoelectric conversion, the apparatus is not easily handled, and mobility in the case of measuring mobility is lacking.

In order to eliminate the disadvantages, it is possible to use a semiconductor photodetector of small size, for example, "an avalanche photodiode" instead of the photomultiplier tube 8. However, if the natural particulate 7 in the fluid 5 to be measured passing the interference fringes such as, for example, the normal flow of the air is measured, the particles contained in the air in natural state have 0.5 to 1 μm of a diameter being small.

Therefore, the intensity of the scattered light reflected from the air is reduced. Thus, the obtained S/N ratio is very deteriorated. Since the the avalanche photodiode which receives the reflected light has an amplification factor of a signal of 1/1000 or less than that of the photomultiplier tube 8, its output signal has an improper S/N ratio. As a result, signal processor 9 may not operate properly, and there is a danger of calculating un erroneous velocity.

In order to improve the S/N ratio of the prior art as described above, it was necessary to measure the intensity of the reflected light from the natural particulate 7 by improving it by increasing the intensity of the laser light reflected from the natural particulate 7 by using a laser having a large output as the light source. However, this configuration increases the size of the entire apparatus. As a result, its portability is reduced. It is also difficult to obtain a simple and ready measurement of velocity.

On the other hand, a method of feeding particles having a large diameter into the fluid 5 to be measured and measuring strong reflected light from the particles can be considered. However, the more the particles are increased in size, the greater the intensity of the reflected light from the particles becomes. However, a problem exists in that large particles flow at a lower velocity than the fluid 5 to be measured.

As a result, the velocity of relatively large particles flowing at a lower velocity than the fluid in the fluid to be measured will be obtained and inaccurate data will be generated if a plurality of natural particulate pass substantially simultaneously through the interference fringes. Therefore, there arises a problem in that the error of the measured result is also increased.

OBJECT AND SUMMARY OF THE INVENTION

Accordingly, it is a primary object of the present invention to provide a laser Doppler velocimeter capable of accurately measuring the velocity of natural particulate by using interference fringes of laser light while preventing decreases in the measuring accuracy due to influences of the size of natural particulate passing the interference fringes or simultaneously passage of a plurality of natural particulate through the interference fringes. It is another object of the present invention to provide a laser Doppler velocimeter capable of accurately, simply and readily measuring the velocity of only natural particulate smaller than the interval of interference fringes due to a semiconductor laser of natural particulate flowing in fluid to be measured and not measuring if a plurality of natural particulate pass the interference fringes.

In order to achieve the above-described object of the invention, there is provided a laser Doppler velocimeter which comprises a laser Doppler velocimeter section having a laser a beam splitter division for splitting a laser light from one laser light into two laser lights, a focusing optical division for focusing the two laser lights to a region to be measured to form interference fringes, one or one set of photodetectors opposed to and disposed at an equal interval to the interference fringes for receiving the lights from the region to be measured, one or one set of converters for converting the output of these photodetectors into a electrical signal of a predetermined wavelength on the basis of at least two different threshold values, and one or one set of arithmetic units for comparing the signals from these converters to calculate a velocity. The converter has a comparator for converting the output signals of said photodetector into square waves according to different threshold values, the arithmetic unit having pulse counters for counting the number of the square waves, a digital comparator for comparing the counted results of the pulse counters according to predetermined conditions, and a computing circuit for calculating the flowing velocity from the compared result of the digital comparator with the results of the pulse counters.

The laser Doppler velocimeter of the present invention arranged as described above uses the laser as its light source, receives the reflected light from the particles in the fluid to be measured passing the interference fringes formed on the region to be measured by the photodetector, converts the Doppler signal from the photodetector to a predetermined waveform according to at least two different threshold values (e.g. regarding the voltage), compares the processed signals in the arithmetic unit to judge that the reflected light is from one natural particulate, and calculates the velocity from the judged result and the processed result of the converter. An accurate velocity can be simply calculated by deleting the reflected lights from the large particle having the lower velocity than the velocity of the fluid to be measured or a plurality of natural particulate by the series of the processes.

As a modified example of the above embodiment of the present invention, a laser is used as the light source, and the scattered lights from the particles of the fluid to be measured passing the interference fringes formed on the region to be measured are arranged to be received by at least a pair of photodetectors disposed at an equal distance. Therefore, when the natural particulate pass the interference fringes by feeding the fluid to be measured including the natural particulate to the region to be measured, the reflected light by the natural particulate are sensed by the photodetectors as the Doppler signals of the same phase. Since the Doppler signals of the same phase are added to intensify the intensity of the Doppler signal, its noise component is relatively reduced in intensity. Therefore, its S/N ratio is improved.

The intensified Doppler signals are converted to a predetermined waveform (e.g., a square wave) according to at least two different threshold values, and the processed signals are compared by the arithmetic unit and judged so that the scattered light is from one natural particulate. Therefore, the velocity is calculated. Since the calculation of the velocity is performed by deleting the scattered lights from the large particles having lower velocity than the velocity of the fluid to be measured and a plurality of natural particulate by the above-described process, accurate velocity can be simply measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a schematic structural view of a first embodiment of the present invention;

FIGS. 2A and 2B are views showing waveforms of a converter of a scattered light from natural particulate in the first embodiment, wherein FIG. 2A is a waveform diagram of a voltage signal, and FIG. 2B is a waveform diagram of a square wave;

FIGS. 3A and 3B are waveform diagrams of a converter of a scattered light from large particles in the first embodiment, wherein FIG. 3A is a view showing the waveform of a voltage signal, and FIG. 3B is a view showing the waveform of a square wave;

FIG. 4B is a schematic structural view of an electric circuit modified example of the second embodiment;

FIG. 9 is a detailed circuit diagram of a signal malfunction detector of the third embodiment;

FIGS. 13A and 13B are waveform diagrams showing waveforms of a signal processor of a scattered light from a large particle by a conventional laser Doppler velocimeter, wherein FIG. 13A is a waveform diagram of a voltage signal, and FIG. 13B is an output waveform diagram of a high pass filter; and FIGS. 14A and 14B are waveform diagrams of an apparatus for signal processing a scattered light from a particle smaller than the spacing of the interference fringes in the conventional laser Doppler velocimeter, wherein FIG. 14A is a waveform diagram of a voltage signal, and FIG. 14B is an output waveform diagram of a high pass filter.

DETAILED DESCRIPTION OF THE PREFERRED EMBODIMENTS

First Embodiment

Figure 1B:
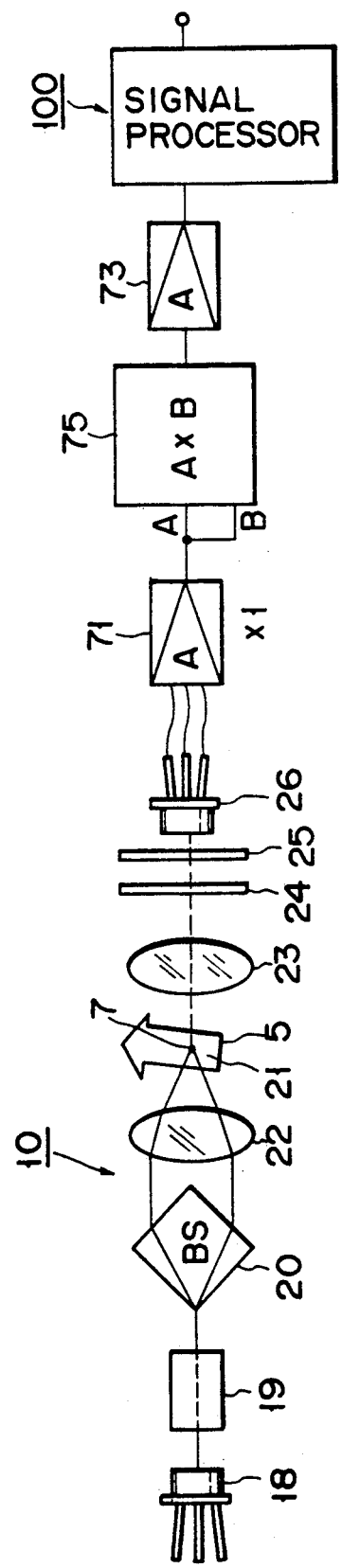
FIG. 1B is a schematic structural view of a modified example of the first embodiment.

In FIG. 1A showing a first embodiment, the schematic arrangement of a measuring system is shown in a block diagram. In FIG. 1A, a semiconductor laser 18 emits a red laser light having a wavelength of 670 nm. The semiconductor laser 18 is driven by a power supply (not shown) to emit the laser light. A collimator lens 19 is provided on an optical axis at the front surface side of the semiconductor laser 18 to reduce the enlarging angle of the laser light, thereby forming a substantially parallel optical beam. A beam splitter division for splitting the transmitted optical beam into two parallel beam beams parallel to each other in the same phase at an interval of 15 mm in substantially equal intensity such as, for example, a beam splitter 20 is provided at the transmission side of the beam of the collimator lens 19. A first convex lens 22 having a focal length of 50 nm for focusing the split two optical beams to a region 21 to be measured is provided at the transmission side of the beam splitter 20. Interference fringes having a fringe spacing of about 2.3 μm by the two are formed on the region 21 to be measured by the first convex lens 22.

Further, a second convex lens 23 of a second focusing optical system opened so as to be opposed to the interference fringes formed as described above is provided. It is preferably required that the optical axis of the second convex lens 23 passes the center of the interference fringes. However, since the interference fringes are formed in a very small region and can be practically regarded as a point, the present invention is not limited to the above-described arrangement. An avalanche photodiode (hereinafter referred to as an "APD") 26 for receiving the focused light through an interference filter 24 and a pinhole 25 is disposed at the transmission side of the second convex lens 23.

A signal processor 100 converts an output signal from the APD 26 into a signal having a predetermined waveform with two high and low threshold values in a converter 28, compares the converted signals to calculate a velocity in an arithmetic unit 29, and displays a result on a display unit (not shown). The converter 28 obtains a voltage signal on the basis of the output of the APD 26 and outputs square waves according to the predetermined threshold values of two different high and low voltages Vl and Vh. The converter 28 has an amplifier 30 for amplifying the output of the APD 26, and low and high threshold value comparators 31a and 31b inputting the output from the amplifier 30.

The arithmetic unit 29 has pulse counters 32a and 32b for respectively counting the numbers of the output pulses of the square waves of the comparators 31a and 31b, a digital comparator 33 for comparing the counted values counted by the pulse counters 32a and 32b, and a computing circuit 34 for calculating a velocity from the compared result of the digital comparator 33 and the counted value of the pulse counter 32b of the high threshold value side.

The laser Doppler velocimeter of the first embodiment of the present invention arranged as described above measures an air velocity of fluid 5 to be measured (e.g., the air fed from a blower). A laser light is emitted from the semiconductor laser 18 in this measurement to form interference fringes on the region 21 to be measured. It is set that the fluid 5 to be measured flows in the region 21 to be measured and the region 21 to be measured is set so that natural particulate 7 having 0.5–1 μm of a diameter contained in the fluid 5 to be measured flow together with the fluid 5 to be measured.

The natural particulate 7 pass the interference fringes when flowing through the region 21 to be measured, receive the lights upon passing of the interference fringes, and reflects the light. A portion of the reflected light is incident to the second convex lens 23 disposed to be opposed to the interference fringes, focused to the APD 26 through the interference filter 24 and the pinhole 25, and the APD 26 outputs a Doppler signal.

If the natural particulate 7 flowing to the region 21 to be measured has a size equal to or smaller than the spacing d of the interference fringes, the Doppler signal of the APD 26 is amplified by the amplifier 30 to a voltage signal 35 shown in FIG. 2A, which is in turn output to the comparators 31a and 31b. The comparators 31a and 31b convert the voltage signal 35 into square waves Ph and Pl shown tn FIG. 2B according to the threshold values of the two different high and low voltages Vh and Vl. The numbers nl and nh of the output pulses of predetermined time t of the converted square waves Pl, Ph are respectively counted by the pulse counters 32a and 32b. The counted values nl and nh of the pulse counters 32a and 32b are compared by the digital comparator 33. If the counted value nh of the pulse counter 32b of the high threshold value side is equal (nh=nl) to or larger by one count (nh=nl +1) than the counted value nl of the pulse counter 32a of the low threshold value side, the counted value nh is output to the computing circuit 34 as true data. The computing circuit 34 calculates a velocity v of a direction perpendicular to the interference fringes by the calculation of $v = nh \times d/t$ from the spacing d of the known interference fringes, the counted value nh of the pulses by the pulse counter 32b and the counting time t.

If the particles flowing to the region 21 to be measured is larger than the spacing d of the interference fringes (e.g., a diameter of several m to several tens of μm of the particles existing in the air), the particles reflect the scattered lights from a plurality of portions having strong brightness of the interference fringes. Accordingly, the output of the APD 26 contains a dc component, and a voltage signal 36 shown in FIG. 3A is input to the comparators 31a and 31b. The comparators 31a and 31b convert the voltage signal 36 containing the input dc component into square waves Ql and Qh shown in FIG. 3B according to the threshold values Vl and Vh. The square wave Ql output from the low threshold value comparator 31a becomes a continuous state at an intermediate high level. As a result, the comparator 31a counts mh numbers of pulses of the square wave Qh for the predetermined time t, while the comparator 31b counts only $(ml \leq (mh-2))$ numbers of pulses of the square wave Ql of the square wave Ql for the predetermined time t. If a plurality of natural particulate 7 simultaneously pass the interference fringes, the output of the APD 26 becomes the sum of the scattered lights from the natural particulate 7. Accordingly, the output contains the dc component similarly to that in the case where the particles are large, and the difference of the numbers ml and mh of the pulses of the square waves Ql and Qh become 2 counts or more. Therefore, when the digital comparator 33 compares the numbers ml and mh of the pulses, the counted value mh of the pulse counter 32b of the high threshold value side is not regarded as being true data, and hence the pulse counter 32b does not output to the computing circuit 34.

In the laser Doppler velocimeter of this embodiment arranged as described above, the threshold value voltages Vl and Vh of the low and high threshold value comparators 31a and 31b of the converter 28 are respectively set to different predetermined values to process so as to determine a signal of the scattered light only from one natural particulate 7 flowing substantially at the same velocity as the fluid 5 to be measured and to process the signal by the scattered light in a simple configuration after the determination. Therefore, the velocity of the fluid 5 to be measured can be readily and accurately measured. As the light source, the semiconductor laser 18 is used, and as the optical detection converter, the APD 26 is used. Thus, the entire apparatus can be reduced in size, increased in its life, opportunities of replacement of parts and regulations to be executed along with the replacement are reduced, thereby providing a laser Doppler velocimeter resulting in an easy maintenance.

In a modified example of the first embodiment shown in FIG. 1B, a plurality of amplifiers 71 and 73, and a multiplier 75 having two input signal systems A and B for multiplying these two signals to produce a product $(A \times B)$ are added before the above-described signal processor 100.

Second Embodiment

Figure 4A:
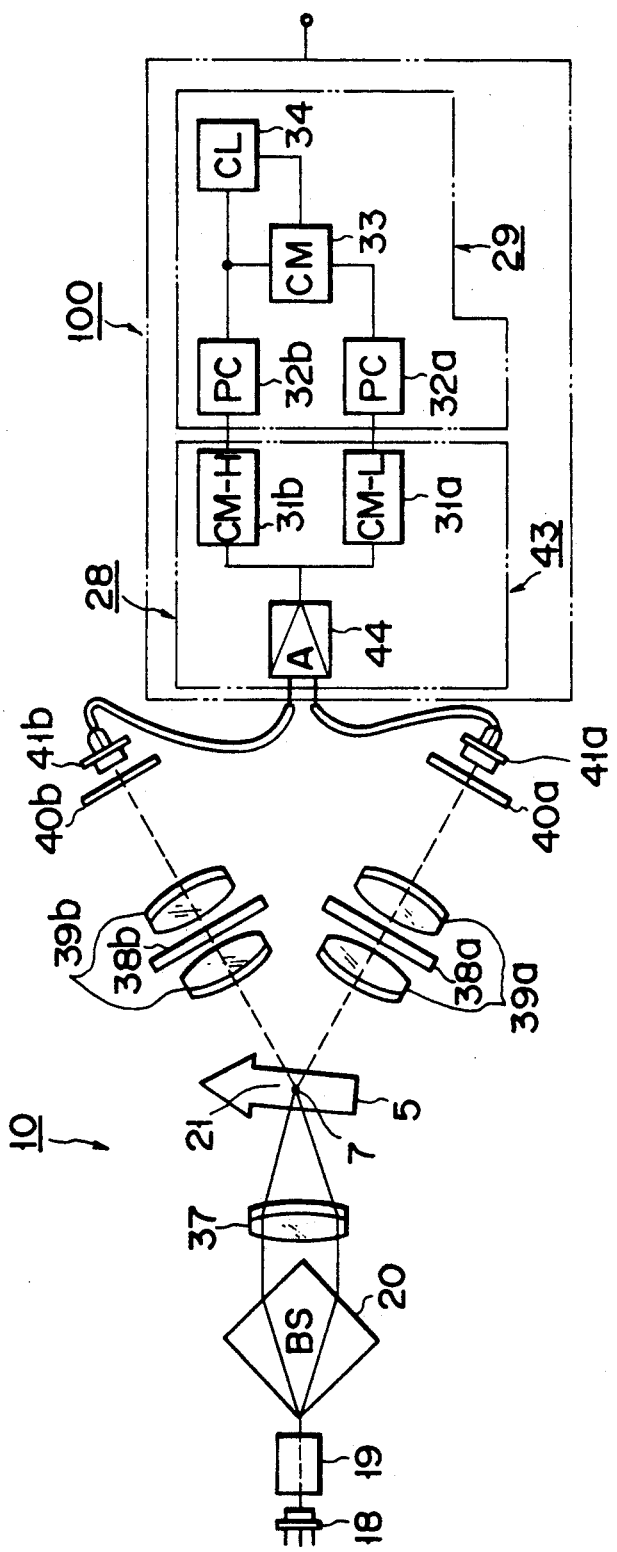
FIG. 4A is a schematic structural view of a second embodiment of the present invention.
Figure 5:
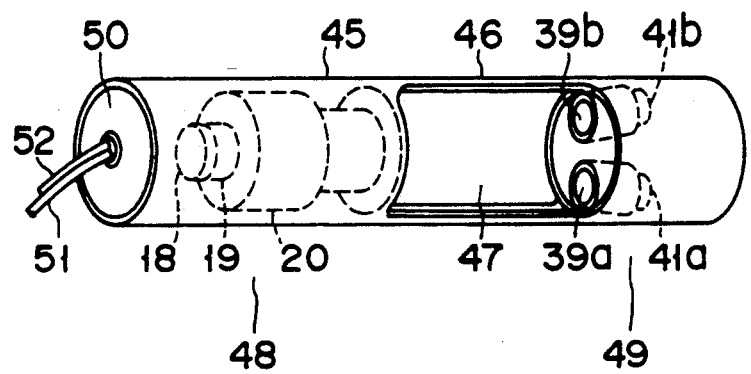
FIG. 5 is a perspective view showing partly in transmission an arrangement of a main portion of the second embodiment.
Figure 6:
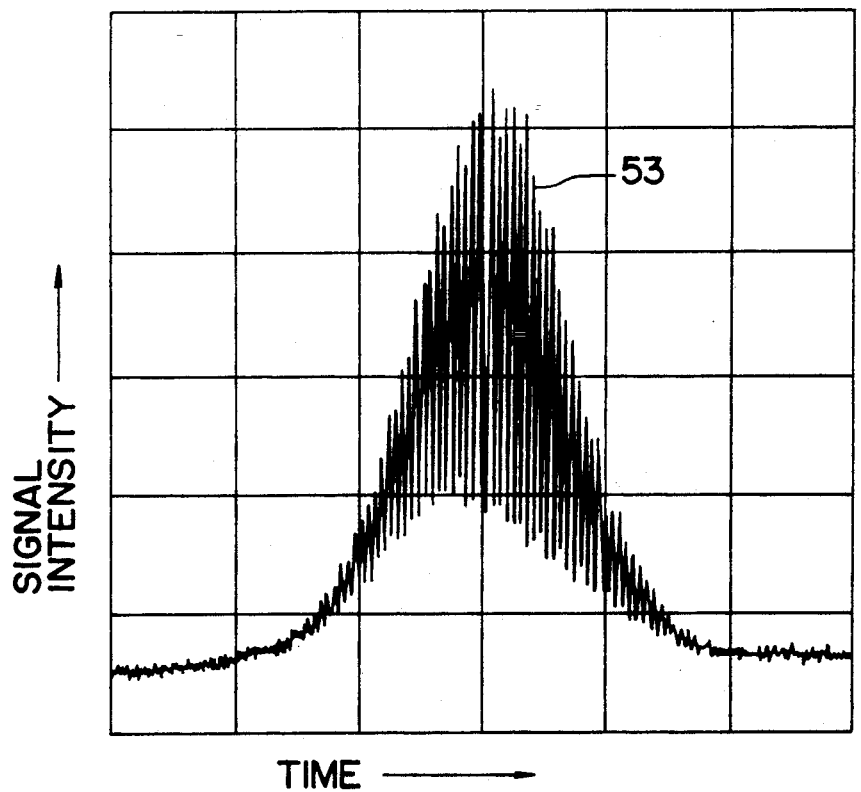
FIG. 6 is a characteristic curve diagram showing a Doppler signal of the second embodiment.

In FIG. 4A showing a second embodiment of the present invention, the same parts as those of the first embodiment are denoted by the same or equivalent reference numerals, the description thereof will be omitted, and only a different portion will be described. FIG. 4A shows a schematic structure of a laser Doppler velocimeter modified in the arrangement of a measuring system. FIG. 5 is a perspective view showing party in transmission the structure of the main portion of the measuring system, and FIG. 6 is a characteristic curve diagram showing the measured result of the apparatus of this embodiment.

As a first focusing optical division 37 provided at the transmission side of a beam splitter 20 for focusing split two laser beams to a region 21 to be measured, a first convex lens having a focal length of 50 mm is, for example, provided to form interference fringes (of light and dark) on the region 21 to be measured. A pair of second focusing optical systems such as, for example, second convex lens groups 39a and 39b having a focal length of 50 mm, in which interference filters 38a and 38b are disposed between the respective lenses are provided to be opened so as to be opposed to the formed interference fringes at positions spaced at an equal distance from the interference fringes. It is preferably required that the paired second convex lens groups 39a and 39b are arranged so that the optical axes thereof pass the center of the interference fringes and are disposed at positions spaced at an equal distance from the center of the interference fringes. Further, it is also required that the optical axes of the paired second convex lens groups 39a and 39b are disposed in a plane of one fringe including the center of the interference fringes. However, since the interference fringes are formed in a very small region and can be practically regarded as being a point, the present invention is not limited to the particular embodiment.

The APDs 41a and 41b for receiving the focused lights through the pinholes 40a and 40b are disposed at the transmission side of these second convex lens groups 39a and 39b. The output terminals of the APDs 41a and 41b are connected to the input terminal of the amplifier 44 of the converter 43 of a signal processor 100 composed substantially in the same manner as the first embodiment.

The signal processor 100 has the converter 43 and a computing circuit 29 in the same manner as the first embodiment. The converter 43 has an amplifier 44 for adding and amplifying signals input from the APDs 41a and 41b, and low and high threshold value comparators 31a and 31b inputting the output of the amplifier 44.

As shown in FIG. 5, an optical system from the semiconductor laser 18 to the APDs 41a and 41b is contained in a cylindrical outer case 45 having a diameter of 35 mm of 300 mm and a length of 300 mm and an opening 47 formed by an opening through the opposed surfaces of the cylindrical surface except a connector 46 for connecting both ends is provided at the intermediate portion of the outer case 45. A light transmitter 48 for containing an optical system from the semiconductor laser 18 to the first convex lens 37 opened at the transmission side with the opening 47 is formed at one end side of the outer case 45. An optical detector 49 for containing an optical system from the second convex lens groups 39a and 39b opened at the light receiving side with the opening 47 to the APDs 41a and 41b is formed at the other end side of the outer case 45 opposed to the light transmitter 48 through the opening 47. According to the configuration, a region 21 to be measured is formed substantially at the center of the opening 47, and fluid 5 to be measured containing natural particulate 7 flows to the opening 47 so as to cross perpendicularly the interference fringes of the region 21 to be measured. A power supply line 51 connected to a power supply (not shown) for driving to emit a light from the semiconductor laser 18, and a signal line 52 for outputting light reception signals transmitted through wires in the outer case 45 from the APDs 41a and 41b and transmitting the signals to the signal processor 100 are wired therethrough.

In the laser Doppler velocimeter of the present invention arranged as described above, the velocity of the fluid 5 to be measured (e.g., the air fed from a blower) is measured. In this measurement, a laser light is emitted from the semiconductor laser 18 to form interference fringes (of light and dark). The outer case 45 is inserted into the fluid 5 to be measured, and disposed so that the fluid 5 to be measured flow to the opening 47. In this disposition, natural particulate 7 contained in the fluid 5 to be measured flow together with the fluid 5 to be measured to the region 21 to be measured.

The natural particulate 7 pass the interference fringes lights when flowing through the region 21 to be measured, receive the light upon passing of the interference fringes, and reflects the light. A portion of the scattered lights is incident to the second convex lens groups 39a and 39b disposed to be opposed to the interference fringes, and focused to the APDs 41a and 41b through the interference filters 38a and 38b and the pinholes 40a and 40b. Since the optical system from the second convex lens groups 39a and 39b to the APDs 41a and 41b is disposed at an equal distance from the interference fringes at this time, output signals from the APDs 41a and 41b are obtained as the Doppler signals of the same phase.

The output signals, i.e., the electrical signals from the APDs 41a and 41b are input to the signal processor 100, added to each other in the amplifier 44 to obtain a characteristic curve 53 of the Doppler signal shown in a graph in which an abscissa indicates a time and an ordinate indicates a signal intensity as shown in FIG. 6. More specifically, the signal intensity of a noise component at the right and left sides of the characteristic curve 53 in FIG. 6 is lowered as an average intensity. On the other hand, in comparison, the signal intensity of the Doppler signal at the center is obtained as an intensified signal. Then, the added signal is processed in the same manner as the first embodiment described above to calculate the velocity of the natural particulate 7 in a direction perpendicular to the interference fringes. The obtained velocity is displayed as a velocity on a display unit (not shown). Since the velocity displayed on the display unit of the signal processor 100 has a velocity component in a direction perpendicular to the interference fringes, the position for accurately measuring the flowing velocity of the fluid 5 to be measured is discovered by regulating the inserting direction of the outer case 45 so that the value of the display unit becomes maximum on the way of the measurements. As a result, a desired measurement can be performed.

Since the laser Doppler velocimeter of the second embodiment is arranged as described above, the same operation and effect as those of the first embodiment are obtained, and since the pair of APDs 41a and 41b are disposed at the same d stance to the interference fringes, two Doppler signals of the same phase are obtained, and added to improve its S/N ratio, thereby realizing an accurate measurement. Since the optical system from the semiconductor laser 18 to the APDs 41a and 41b is integrally formed, regulation of the optical axis for measurements is eliminated, and since the optical system is formed is small size, it is portable. Therefore, it can be easily set to a place to be measured for carrying and measuring. Since this embodiment uses a red visible light as the laser light, the region to be measured can be easily visually confirmed, and hence position setting for measurements can be facilitated.

In the second embodiment described above, the pair of avalanche photodiodes of the semiconductor optical detectors are disposed at the equal distance to the interference fringes oppositely at the light receiving sides. However, the present invention is not limited to the particular embodiment. For example, a plurality of pairs of the avalanche photodiodes may be disposed to improve the S/N ratio Further, the second focusing optical system (the interference filters 38a and 38b as well as the second convex lens groups 39a and 39b) may be eliminated by increasing the output of the semiconductor laser 18 or disposing the APDs 41a and 41b near the interference fringes or integrally associating a second focusing optical system with the APDs 41a and 41b.

Structural modified example of the second embodiment of the present invention will be described with reference to FIGS. 4B and 4C. The same parts as those in the first and second embodiments described above will be denoted by the same or equivalent reference numerals, and the signal processor 100 will be omitted.

When a laser emitted from the semiconductor laser 18 passes the collimator lens 19, the enlarging angle of the laser light is reduced to form parallel beams. A beam splitter 20 for splitting the laser light from the collimator lens 19 into two laser beams is provided. The above-described arrangement is structurally equal to the first embodiment.

In FIG. 4B showing a circuit and structurally modified example 1 of the second embodiment, the laser light emitted from the convex lens 37 passes the region 21 to be measured, and is then scattered. The laser light is separated to two systems of two sets of interference filters 38a, 38b and second convex lens group 39a, 39b equivalent to the second convex lens 23 and the interference filter 24 in a plurality of directions (two directions in this embodiment) in the scattering directions, and converted to signals of two routes via the pinhole 40a, the APD 41a and the pinhole 40b, the APD 41b as described above. Thereafter, the signals are amplified by amplifiers 71 and 72 and multiplied by a multiplier 75 in the same manner as the modified example as described above, and introduced through an amplifier 73 to the signal processor 100.

Figure 4C:
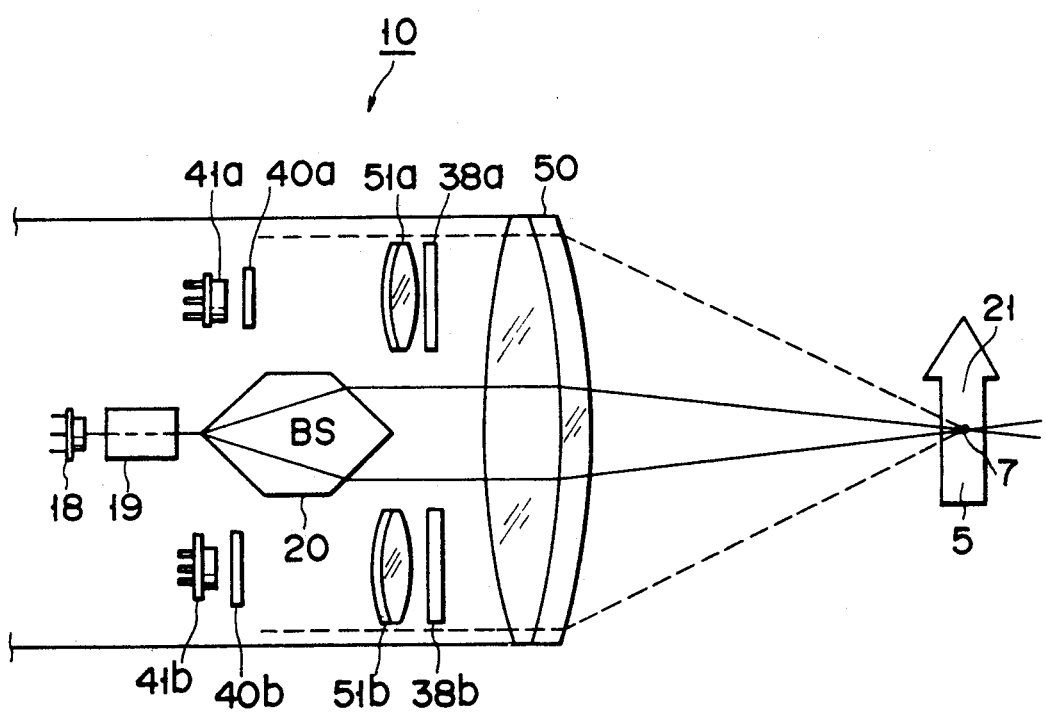
FIG. 4C is a schematic structural view showing a structural modified example of an optical system of the second embodiment.

In FIG. 4C showing a structural modified example 2 of an optical system, lens 50 for focusing split two laser beams to a region 21 to be measured is provided, as shown in FIG. 4C. Interference fringes are formed on the region 21 to be measured. A pair of lenses 51a and 51b are provided at positions isolated at an equal distance from the region 21 to be measured, formed with the interference fringes, and interference filters 38a and 38b for transmitting only the laser of the used wavelength are provided on the front surfaces of the lenses 51a and 51b. AFDs 41a and 41b for receiving the focused light through pinhole 40a and 40b are disposed at the transmission side of the lenses 51a and 51b.

The electric signals from the APDs 41a and 41b are converted to velocities input to the above-described signal processor (not shown) and displayed. Natural particulate 7 contained in the fluid 5 to be measured flow also to the region 21 to be measured. The natural particulate 7 pass the interference fringes when flowing to the region 21 to be measured, and emit scattered lights. The scattered lights are converted to parallel optical beams through the lens 5 and focused to the APDs 41a and 41b through the lenses 51a and 51b. According to this optical system, there is an advantage that the photodetected portion is not inserted into the fluid to be measured as in the previous optical system as described above and the flow is not disordered.

Figure 7:
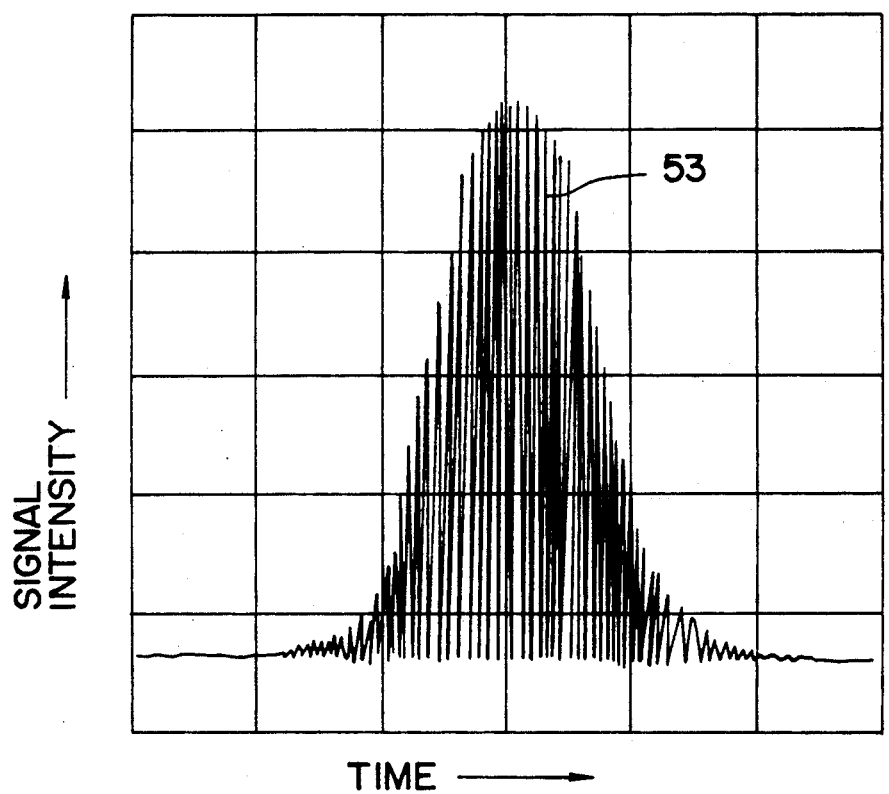
FIG. 7 is a characteristic curve diagram showing a Doppler signal of the second embodiment.

FIG. 7 is a characteristic curve diagram showing a Doppler signal obtained by the embodiment in FIG. 4B. In this embodiment, a multiplier 75 multiplies a pair of output signals from the APDs 41a and 41b. An output of multiplier 75 is input to a amplifier 73, and fed to a signal processor 100. In comparison with the characteristic curve diagram in the second embodiment of FIG. 6, its S/N is preferably improved as apparent from the reduction in the irregularity in the timing variation distribution of the signal intensity.

In the embodiments described above, other semiconductor laser or a semiconductor optical detector may be combined instead of the red semiconductor laser and the avalanche photodiode. Further, if the enlarging angle of the laser light is reduced by using the semiconductor laser having a small aspect ratio, it is not necessary to provide the collimator lens. Thus, the embodiment may be modified suitably.

According to the present invention as apparent from the foregoing description, the semiconductor laser is used as the light source, the scattered lights from the interference fringes are received by the semiconductor optical detectors, the outputs from the semiconductor optical detectors are processed to a predetermined waveform on the basis of the different threshold values in the converter, and the processed signals are compared in the arithmetic unit to calculate the velocity. Therefore, the laser Doppler velocimeter in which the Doppler signal can be accurately obtained from one natural particulate of the fluid to be measured, and the velocity of the fluid to be measured can be accurately, simply and readily measured can be provided.

Third Embodiment

Figure 8:
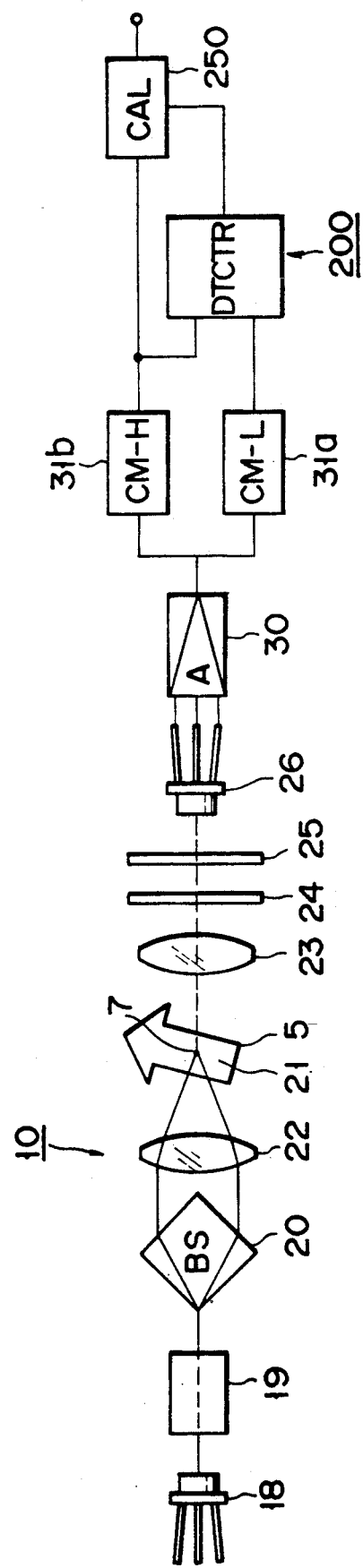
FIG. 8 is a schematic structural view of a third embodiment of the present invention.

FIG. 8 is a block diagram of the schematic arrangement of a third embodiment of a laser Doppler velocimeter according to the present invention. In FIG. 8, a semiconductor laser 18 is driven by a power supply (not shown) to emit the lasar light. A collimator lens 19 is provided on an optical axis at the front surface side of the semiconductor laser 18 to reduce the enlarging angle of the laser light, thereby forming a substantially parallel optical beam. A split refraction optical system for splitting the transmitted optical beam into two parallel optical beams parallel to each other in the same phase in equal intensity such as, for example, a beam splitter 20 is provided at the transmission side of the optical beam of the collimator lens 19. A first focusing optical system 22 for focusing the split two optical beams to a region 21 to be measured is provided at the transmission side of the beam splitter 20. Interference fringes of two strong and weak optical beams are formed on the region 21 to be measured. Further, a second focusing optical system 23 disposed at a position opened so as to be opposed to the interference fringes formed as described above is arranged. When natural particulate 7 pass the interference fringes in the region 21 to be measured, scattered lights varying strongly or weakly in response to the brightness of the interference fringes are focused and received. An avalanche photodiode (hereinafter referred to as an "APD") 26 for receiving the focused light through an interference filter 23 and an optical mask 25 having pinholes is disposed at the transmission side of the second focusing optical system 23. The output of the APD 26 is amplified by an amplifier 30, and converted to square waves Pl and Ph (see FIGS. 10A and 10B) by low and high threshold valve comparators 31a and 31b. A signal malfunction detector 200 which inputs the square waves Pl and Ph determines the waves Pl and Ph as "a normal signal" or "an abnormal signal" to be accurately measured from the mutual relationship between the square waves Pl and Ph. If the signal malfunction detector 200 determines it as "normal", it outputs a measurement start signal to the following computing circuit 250. The measurement start signal is stopped when the "abnormal" is generated. The computing circuit 250 which receives the measurement start signal measures a time t required to input n numbers of the square waves Ph to be input simultaneously. However, if the measurement start signal is stopped before n numbers of the square waves Ph are input, data at that time is deleted. If n numbers of the square waves Ph are input and the time t is obtained, a velocity V is calculated according to the following equation from the relationship of the spacing 1 of the known interference fringes, the number m of the square waves and the time t.

$$V = m \times 1/t$$

Then, a method of determining whether the input signal is normal or abnormal by the comparison of the square waves Pl and Ph will be described in more detail.

Figure 10A:
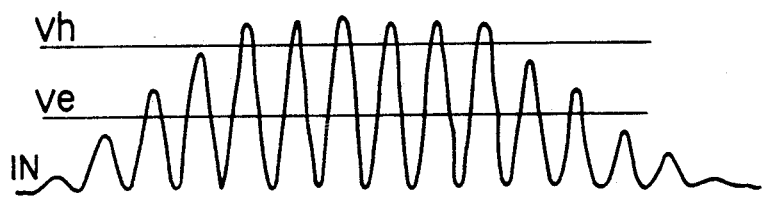
FIGS. 10A and 10B are operational waveform diagrams of a signal malfunction detector when a normal signal is input to the signal malfunction detector of the third embodiment.
Figure 10B:
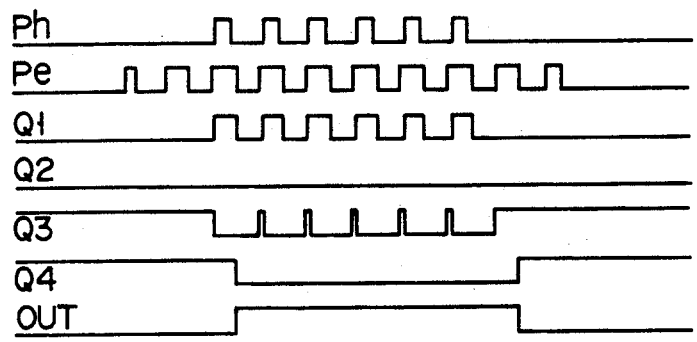

FIG. 9 shows a detailed circuit configuration of a signal malfunction detector 200 (in a dashed-and-dotted line). FIGS. 10A and 10B exemplify operating waveforms of the "normal input", and FIGS. 11A and 11B exemplify an example of the operating waveform of the "input to be determined as the abnormal signal".

In the signal malfunction detector 200, in the case of a normal input, the timings of two signals Ph and Pl are sequentially varied "rising of Pl", "rising of Ph", "falling of Ph" and "falling of Pl" from the relationship of the input waveform to the comparator and the threshold values Vh and Vl.

The following circuit elements of the signal malfunction detector 200 of FIG. 9 will be described with reference to the operating waveforms in the case of the normal input shown in FIGS. 10A and 10B and the operating waveforms in the case of the abnormal input shown in FIGS. 11A and 11B. Main elements will be largely classified. There are first flip-flop FF 201 and second flip-flop FF 202 for constituting a "low level signal"processor, third flip-flop FF 203 and fourth flip-flop FF 204 for constituting a "high level signal"processor, and an OR gate 220 for taking a logic sum of the outputs of the high and low level signal processors.

First, the operation of the first flip-flop FF 201 and the second flip-flop FF 202 will be described.

A square wave signal Ph is connected to the clock input terminal (hereinafter referred to as "a CK input terminal") of the first flip-flop (hereinafter referred to as an "FF") 201, and a square wave signal Pl is connected to the clear input terminal (hereinafter referred to as a "CL input terminal"). An input terminal is pulled up to VCC.

The D input terminal of the second FF 202 is connected to the output terminal Q of the first FF 201, and a signal Q1 is input. The square wave signal Ph is input to the CK input terminal, and its output Q2 is supplied subsequently to the OR gate 230 (to be described in detail laser).

In the operation of the first FF 201 in the case of the normal input as described above, the D input (H level) is output to the output terminal Q as the output Q1 at the "rising of the Ph", the first FF 201 is cleared at the "dropping of the Pl", the output Q1 is returned to an L level, and then the same operation is repeated as shown in the Q1 square waveform of FIG. 10B. At this time, the output of the first FF 201 becomes an H level after the operation transfer time intrinsic for the FF from at the "rising of Ph". Therefore, since the D input is still at an L level at the rising of the CK input (i.e., the square wave signal Ph) in the second FF 202, the output Q2 is not varied but remains at the L level. In other words, in the case of the normal input signal as shown in FIG. 10B, the output of the second FF remains at the L level. On the contrary, as shown in FIG. 11A, if a dc component is contained in the input so that the amplitude of the input is not lowered to Vl or lower, the first FF is not cleared, the Q1 remains at the H level, and next Ph is input to the first FF. Therefore, since the output Q2 of the second FF 202 is varied to the H level, the output Q2 of the second FF 202 is varied to an H level, and hence it is judged as being "an abnormal signal".

Then, the operations of the third FF 203 and the fourth FF 204 will be described. Pl is connected to the input terminal CK of the third FF 203, and a signal inverted from the input square wave signal Ph by an inverter 210 is input to the input terminal CL. The D input terminal is pulled up to VCC. The output Q3 of the third FF 203 is connected to the terminal D of the fourth FF 204, and a signal inverted from the input square wave signal Pl by an inverter 211 is input to the input terminal CK. In the operation of the third FF 203 in the case of the above-described normal input, the D input (H level) at the "rising of Pl" is output to the output terminal Q3, the third FF 203 is cleared at the "rising of Ph" (cf. at the "falling" at the CL input terminal of the third FF 203 since it is inverted by the inverter 210), the output Q3 is returned to the L level, and thereafter this operation is similarly repeated as shown by the waveform Q3 in FIG. 10B. At this time, since the third FF 203 is already cleared at the "falling of Pl" in the fourth FF 204 (cf. at the "rising" at the CK input terminal of the fourth FF 204 since it is inverted by the inverter 211), and the output Q3 becomes an L level (i.e., the D input of the fourth FF 204); the output Q4 of the fourth FF 204 remains at the L level and does not vary. In other words, in the case of the normal input signal as shown in FIG. 10A, the output of the fourth FF 204 remains at the L level. On the other hand, if the amplitude of the input is reduced and not raised to the H level as shown in FIG. 11A, the third FF 203 is not cleared, but the output Q3 remains at the H level, and next Pl is input. Therefore, the output Q4 of the fourth FF 204 becomes an H level to be judged as being "an abnormal signal". In the OR gate 220, only if both the outputs Q2 and Q4 become L level, the input for the measurements are judged to be a normal signal (in an accurate measurements), and then the measurement start signal (H level) is output.

As shown in FIGS. 10A and 10B, while the input voltage alternately repeats amplitudes of Vl or lower and Vh or higher without intermittent manner after the input voltage once becomes Vh or higher, the input is judged to be normal, and the measurement start signal is output. (However, OUT=L level).

Figure 11A:
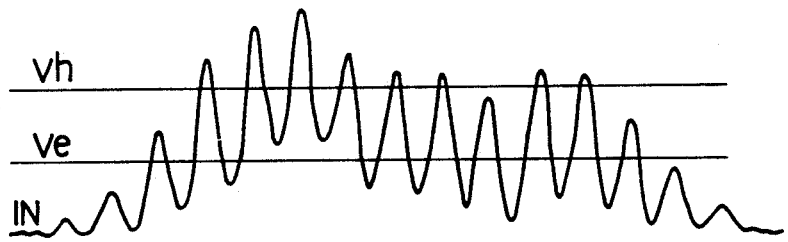
FIGS. 11A and 11B are operational waveform diagrams of a signal malfunction detector when an abnormal signal is input to the signal malfunction detector of the third embodiment.
Figure 11B:
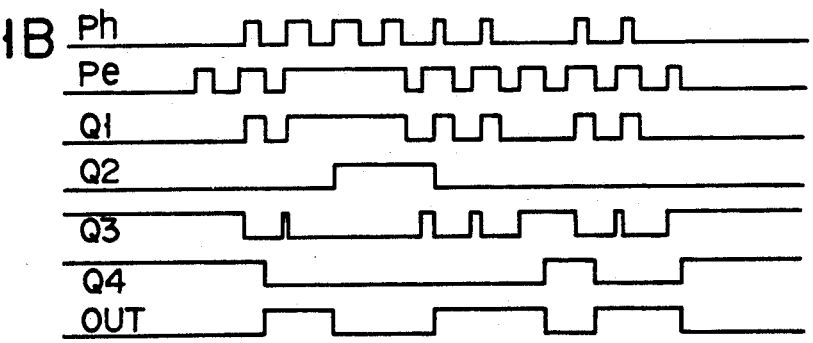
Figure 12:
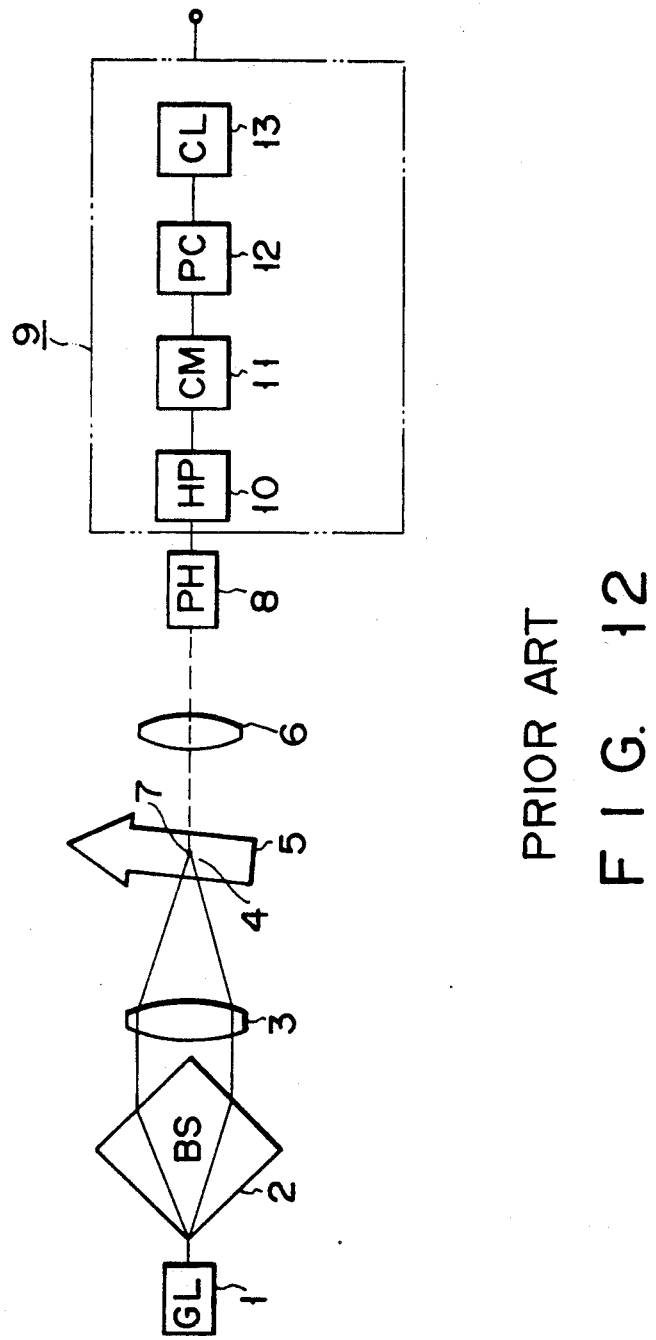
FIG. 12 is a schematic structural view of a conventional laser Doppler velocimeter.
Figure 13A:
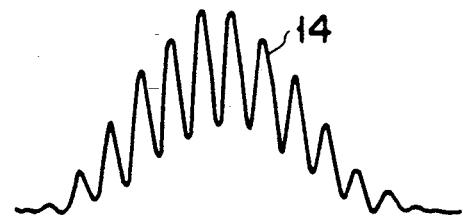
Figure 13B:
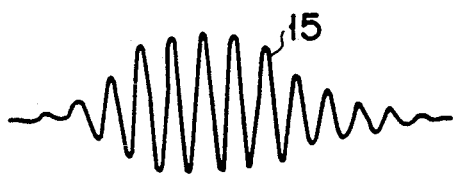
Figure 14A:
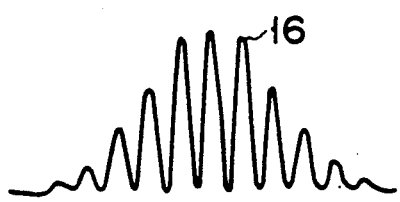
Figure 14B:
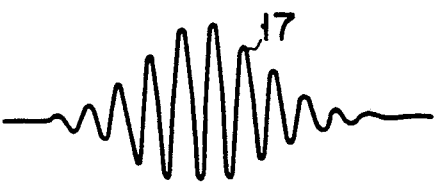

On the other hand as shown in FIGS. 11A and 11B, after the input voltage once exceeds the Vh, its dc component is increased, the input voltage is not lowered to the Vl or lower and the Pl is intermittently varied (i.e., the size of the natural particulate passing through the interference fringes is larger than the fringe spacing, or when other natural particulate is introduced into the interference fringes while one natural particulate is passing, and a reflected light is increased), or after the input voltage once exceeds the Vh, the amplitude is reduced, the Ph is intermittently varied (i.e., other natural particulate passes in phase for cancelling the lights while one natural particulate is passing through the interference fringes). After the "abnormal" is judged, the measurement start signal is stopped at the same time upon generation of the malfunction. (However, OUT=H level).

In the computing circuit 250 connected to the above-described signal malfunction detector 200, since the measurement start signal is stopped before n numbers of the Ph are input, the data at that time are deleted (as abnormal data not proper for the measurement).

Even if the signal becomes again normal after the measuring operation is stopped once upon occurrence of a malfunction, n numbers of the Ph are not input, and hence the data are deleted. The set value of the n is determined according to the number of the interference fringes, and set to about 80% of the number of the Ph when the normal signal is input. Since the conditions for judging the input being normal becomes sever by raising the ratio, its accuracy is improved, but the frequency of the measurements is lowered.

As apparent from the third embodiment as described above, the present invention can obtain the flowing velocity of the fluid to be measured on the basis of only the correct data by deleting improper data for the measurement contained in the signal input by comparing after the signal of the scattered light generated from the natural particulate passing the interference fringes is digitized by the threshold values of the two stages.

Further, since the velocity of the fluid to be measured "to be correctly measured" is calculated by deleting the scattered light (as an object to be measured) from the large particle having slower speed than the velocity of the fluid to be measured and a plurality of natural particulate, an accurate velocity can be simply measured.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A laser Doppler velocimeter comprising a laser, a beam splitter for splitting a laser light beam from said laser into two laser lights, a focusing optical division for focusing said two laser lights to a region to be measured passing a particle to be measured to form interference fringes, an optical detector opposed to the interference fringes for receiving the light from the region to be measured, and a signal processor for converting the output from said optical detector into square wave according to at least two types of different voltage threshold values, judging "a normal measurement signal" only if the comparison result of the square wave generated from the threshold value of a high voltage with another one square wave coincides with a predetermined condition, and calculating the velocity of a particle to be measured according to the period of the square wave at that time.

2. A laser Doppler velocimeter comprising a laser, a beam splitter for splitting a laser light beam from said laser into two laser lights, a focusing optical division for focusing said two laser lights to a region to be measured passing a particle to be measured to form interference fringes, an optical detector opposed to the interference fringes for receiving the light from the region to be measured, and a signal processor for converting the output from said optical detector into square wave according to at least two types of different voltage threshold values, judging "a normal measurement signal" by comparing the square wave generated from the threshold value of a high voltage with another one square wave coincides with a predetermined condition and judging a normal measurement signal only if the comparison coincides with a predetermined various conditions, and calculating the velocity of the particle to be measured according to the period of the square wave at that time.

3. A laser Doppler velocimeter comprising a laser, optical divisions for forming interference fringes according to a laser light beam emitted by said laser, one or a pair of optical detectors for receiving the scattered lights from a particle to be measured passing the interference fringes, signal converters for converting the signal collected by said optical detector into a square wave according to the two types of voltage threshold values containing dc component as it is, a signal malfunction detector for comparing the square wave generated from the threshold value of a high voltage of said two types of threshold values with another square wave and judging "a normal measurement signal" only if the result coincides with a predetermined condition, and a computing circuit for calculating the velocity of a particle to be measured according to the period of said square wave.

4. A laser Doppler velocimeter according to claim 3, wherein said signal malfunction detector comprises:
a "low level signal" processor having a first flip flop (hereinafter referred to as "an FF") FF and a second FF,
a "high level signal" processor having a third FF and a fourth FF, and
an OR gate for taking a logic sum according to outputs of said high and low level signal processors.

5. A laser Doppler velocimeter according to claim 4, wherein said first FF comprises:
a clock input terminal (hereinafter referred to as "a CK input terminal") inputting a square wave signal as a first input signal,
a clear input terminal (hereinafter referred to as "a CL input terminal") inputting a square wave signal as a second input signal, and
an output terminal outputting a first output signal processed as predetermined according to said two input signals, and
said second FF comprises:
an input terminal inputting a square wave signal as a first input signal,
a second input terminal connected to the output terminal of said first FF and inputting said first output signal as second input signal, and
an output terminal outputting a second output signal processed as predetermined according to said two input signals.

6. A laser Doppler velocimeter according to claim 4, wherein said third FF comprises:
a clock input terminal (hereinafter referred to as "a CK input terminal") inputting a square wave signal as a first input signal,
a clear input terminal (hereinafter referred to as "a CL input terminal") inputting a square wave signal as a second input signal, and
an output terminal outputting a third output signal processed as predetermined according to said two input signals, and
said fourth FF comprises:
an input terminal inputting a square wave signal as a first input signal,
a second input terminal connected to the output terminal of said third FF and inputting said third output signal as second input signal, and
an output terminal outputting a fourth output signal processed as predetermined according to said two input signals.

7. A laser Doppler velocimeter for measuring a velocity of a fluid, comprising:
a laser;
a beam splitter for splitting a light from said laser into two laser lights;
at least one focussing optical division for focussing said two laser lights to a region to be measured to form interference fringes;
an optical detector opposed to the interference fringes for receiving the light from the region to be measured;
a converter for preprocessing the output of said optical detector according to at least two different threshold values and converting them into square waves, said converter comprising a plurality of comparators for converting the output signal of said optical detector into signals according to a plurality of different threshold values; and an arithmetic unit for comparing the signal from said converter to calculate the fluid velocity, said arithmetic unit comprising a plurality of pulse counters for counting the numbers of the square waves, a digital comparator for comparing the counted result of said pulse counters according to predetermined conditions, and a computing circuit for calculating the velocity of the fluid to be measured from the compared result of said digital comparator with the results of said pulse counters.

8. A laser doppler velocimeter comprising a laser, a beam splitter for splitting a light from said laser into two laser lights, at least one focusing optical division for focusing said two laser lights to a region to be measured to form interference fringes, an optical detector opposed to the interference fringes for receiving the light from the region to be measured, a converter for preprocessing the output of said optical detector according to at least two different threshold values and converting them into predetermined waveform signals, an arithmetic unit for comparing the signal from said converter to calculate a velocity, first amplifying means for amplifying the output of said optical detector,
a multiplier inputting a plurality of outputs amplified by said first amplifying means for multiplying them, and
second amplifying means for further amplifying the output of said multiplier.

9. A laser Doppler velocimeter comprising a laser, a beam splitter for splitting a laser light from said laser into two laser lights, a focusing optical division for focusing two laser lights at a region to be measured to form interference fringes, a plurality of optical detectors opposed to the interference fringes, disposed at an equal distance and arranged to receive lights from the region to be measured, a signal processor for calculating the outputs from the optical detectors, first and second amplifying means for amplifying the outputs of said optical detector,
a multiplier inputting a plurality of outputs amplified by said first and second amplifying means for multiplying them, and
third amplifying means for further amplifying the output of said multiplier.

* * * * *